April 30, 1968 D. T. N. WILLIAMSON ET AL 3,381,217

DETECTORS FOR ELECTRICALLY CONDUCTIVE PARTICLES

Filed May 22, 1964 4 Sheets-Sheet 1

INVENTORS
DAVID THEODORE NELSON WILLIAMSON,
DOUGLAS WILLIAM BALLANTYNE MUIR

By: Watson, Cole, Grindle & Watson
Attorneys

INVENTORS
DAVID THEODORE NELSON WILLIAMSON,
DOUGLAS WILLIAM BALLANTYNE MUIR

By: Watson, Cole, Grindle & Watson
Attorneys.

DETECTORS FOR ELECTRICALLY CONDUCTIVE PARTICLES

Filed May 22, 1964

INVENTORS
DAVID THEODORE NELSON WILLIAMSON,
DOUGLAS WILLIAM BALLANTYNE MUIR

By: Watson, Cole, Grindle & Watson
attorneys

April 30, 1968 D. T. N. WILLIAMSON ET AL 3,381,217

DETECTORS FOR ELECTRICALLY CONDUCTIVE PARTICLES

Filed May 22, 1964 4 Sheets-Sheet 4

INVENTORS

DAVID THEODORE NELSON WILLIAMSON,

DOUGLAS WILLIAM BALLANTYNE MUIR

By: Watson, Cole, Grindle + Watson attorneys

United States Patent Office 3,381,217
Patented Apr. 30, 1968

3,381,217
DETECTORS FOR ELECTRICALLY CONDUCTIVE PARTICLES

David Theodore Nelson Williamson and Douglas William Ballantyne Muir, London, England, assignors to The Molins Organisation Limited, a British company Filed May 22, 1964, Ser. No. 369,447
Claims priority, application Great Britain, May 23, 1963, 20,643/63
1 Claim. (Cl. 324—41)

Figure 1:
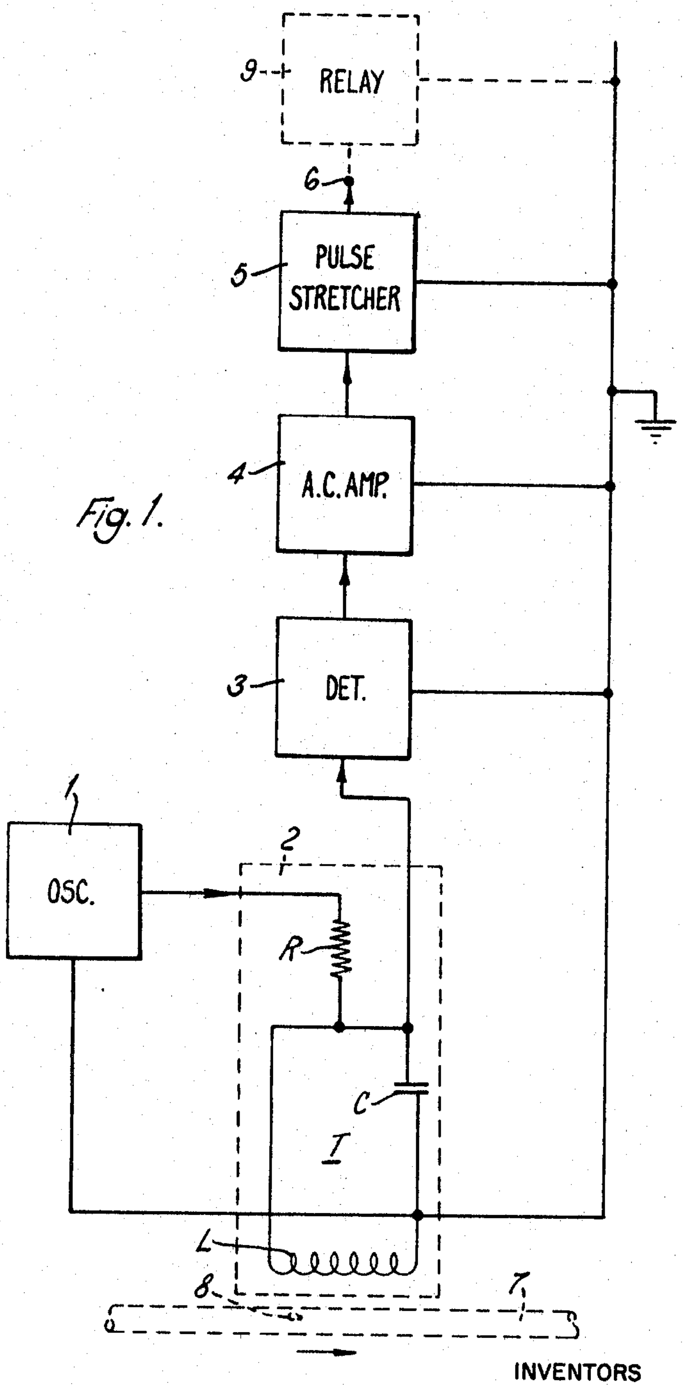

This invention relates to devices for detecting the presence of electrically-conductive particles in other, non-conductive, material. Such devices are useful in a variety of industries, for example in the manufacture of jam the product not infrequently contains rust particles from metallic strip used to secure packages of fruit, and another example is in the manufacture of cigarettes where cigarette-making machines may include tobacco-supporting tape formed of woven wire and when such tapes become worn particles of wire may separate from the tape and become mixed with the tobacco, ultimately being found in the cigarettes produced.

Various devices have been produced for detecting metallic particles in such a context, for example, where particles are necessarily or usually of magnetic material then magnetic means may be employed to sense their presence.

It is an object of the present invention to provide an improved device for detecting the presence of metallic or other electrically-conductive particles in non-conductive material which is capable of high-speed response and will detect the presence of any electrically-conductive material whether or not it has any substantial magnetic properties.

According to the invention there is provided a device for detecting the presence of electrically-conductive particles in non-conductive material, comprising an oscillator arranged to deliver a constant output to a voltage divider circuit consisting of a resistor in series with a tuned circuit containing an inductance, and means for producing a control signal whenever the oscillatory voltage across the tuned circuit changes substantially whenever the value of said inductance alters due to movement of a metallic particle into or out of the field of said inductance.

The oscillator output must be constant, within practical limits as, if it were allowed to fluctuate, undesired control signals would be produced. The resistor of the voltage divider circuit serves to provide some separation between the oscillator output and the tuned circuit; if the latter were connected directly across the oscillator output, the oscillator would tend to oppose changes in its output voltage and thus reduce the changes in the voltage across the tuned circuit from which the control signals are derived.

It will be understood that if any metallic or other electrically-conductive material is present in large pieces then as a piece enters the field of the inductance the oscillatory voltage across the tuned circuit will alter substantially and will remain at its new value for as long as the piece of conductive material stays within said field. However as it is rarely desirable to make any deliberate distinction between large and small pieces of conductive material we prefer to arrange for generation of the control signal in consequence of the actual change in the oscillatory voltage rather than having the control signal produced in response to the establishment of a new level of that voltage although the latter arrangement is also possible.

It is preferred to use a parallel tuned circuit in series with a resistor of such value that in the normal condition of the device, that is when no conductive material to be detected is within the field of the inductance, the oscillatory voltage across the tuned circuit is of the order of one half of the total output voltage delivered to the voltage divider circuit by the oscillator. The effect of introducing electrically-conductive material into the field of the inductance is to change the value of the inductance and to reduce the Q of the tuned circuit, due to the loss of oscillatory energy consequent upon the development of eddy currents in the conductive material. This of course affects the voltage dividing ratio of the voltage divider circuit.

To produce the required control signal it is preferred to connect a detector circuit containing a diode across the tuned circuit and then to apply the output from the detector circuit to an A.C. coupled amplifier containing or followed by a pulse stretching circuit. With such an arrangement whenever there is a change in the oscillatory voltage across the tuned circuit the detector circuit will deliver to the amplifier a pulse and after amplification and stretching this pulse may be utilised as the control signal, for example it may be applied to a relay.

Where for example such a device is used in connection with a continuous-rod cigarette-making machine, the inductance may be placed close to the path of the cigarette rod before the latter is cut into individual cigarettes so that any metallic particles within the rod pass through the field of the inductance and then the stretched pulse may be applied to a relay which when operated trips a control circuit of the machine to stop the machine or temporarily to deflect the cigarettes delivered by the machine into a different output channel from the normal so that cigarettes containing or possibly containing metallic particles may be separated from those free of such foreign matter. Where temporary deflection is to be effected, naturally allowance will need to be made for any time taken for cigarettes to travel from the position at which they pass the inductance to the position at which they can be deflected, but such allowance may be made by incorporating conventional delay circuits or the like between the device and whatever means may be provided for cigarette deflection.

In order that the invention may be fully understood a preferred embodiment will now be described in more detail referring to the accompanying drawing in which:

FIGURE 1 is a schematic block diagram of a device according to the invention, and FIGURES *2a–2c* are detailed diagrams of one suitable circuit for the device of FIGURE 1.

As shown in the drawings the device comprises an oscillator 1 whose output is delivered to a voltage dividing circuit 2 consisting of a resistor R in series with a parallel (rejector) tuned circuit T including a capacitor C and an inductance L. From the voltage dividing circuit 2 the voltage across the tuned circuit T is used as the output and is applied to a detector circuit 3 and the output from the circuit 3 is fed via an A.C. amplifier 4 to a pulse stretcher circuit 5. The output from the pulse stretcher circuit 5 constitutes a desired control signal appearing at terminal 6.

Such a device conveniently is used in conjunction with a continuous rod cigarette-making machine (not shown) and in such an application of the device the inductance L of the tuned circuit T of the voltage dividing circuit 2 will be mounted at some convenient point on the cigarette-making machine so that the cigarette rod produced passes close to the inductance L and within its magnetic field, and on the drawing the cigarette rod is diagrammatically indicated at 7. The said rod may contain metallic or other electrically-conductive particles 8. Also in this application of the device the terminal 6 at which the control signal produced by the device appears will be connected to a relay 9, said relay being connected in or associated with control circuits of the cigarette-making machine so that whenever a control signal is delivered to the relay 9 by the device the cigarette-making machine will be stopped or its output temporarily diverted as may be desired.

The operation of the device shown is briefly as follows: the oscillator 1 produces a constant output which is delivered to the voltage dividing circuit 2 and a fraction of the oscillator output voltage appears across the tuned circuit T and hence is applied to the input of the detector circuit 3. The value of the said fraction depends upon the component values in the voltage dividing circuit and preferably is of the order of one half. So long as a cigarette rod containing no electrically-conductive material or magnetic material is passing through the field of the inductance L the signal received by the detector circuit 3 will be steady and the circuit 3 will deliver a constant D.C. output and therefore no signal will be delivered at the output of the amplifier 4 as this is an A.C. amplifier. As soon as a metallic particle 8 (or any electrically-conductive or magnetic particle) is carried through the field of the inductance L by the cigarette rod there will be a change in the Q of the tuned circuit T due to the appearance of eddy currents in the conductive particle and consequent change in the characteristic of the inductance L. As a further consequence the effective ratio of the voltage dividing circuit will change and as the input it receives from the oscillator 1 does not vary there will be a change in the signal received by the detector circuit 3 and a consequent change in the D.C. output that circuit delivers. This change or pulse will be amplified in the A.C. amplifier 4 and stretched in the pulse stretcher circuit 5 to produce a pulse of useful magnitude at the terminal 6.

The choice of oscillator frequency is dependent upon the circumstances in which the device is to be used but in general the best results are obtained with the highest possible frequency. In the example mentioned, where the device is used in conjunction with a cigarette-making machine it is found that there is a practical upper limit for the oscillator frequency, imposed by the fact that tobacco contains an appreciable quantity of moisture and therefore is electrically-conductive to a certain extent and in view of this factor it has been found that a frequency of 5 megacycles per second is the optimum value. It will of course be understood that when a device embodying the invention is used in association with any type of machine the correct mounting of the inductance L in relation to electrically-conductive parts of the machine is of importance and in general the inductance should be much nearer to the position or path in which the conductive material to be detected may appear than to any conductive part of the machine itself.

Turning to FIGURE 2, this shows in detail a circuit suitable for the device described above with reference to FIGURE 1. The various sections are identified by the same references as are used in FIGURE 1, and it will be appreciated that the circuits employed in the several parts of the device are of types well-known in the art; accordingly no detailed explanation of the circuit of FIGURE 2 will be given.

It may briefly be noted that the circuit shown employs transistors throughout, as their inherent advantages of small size and low power requirements are of special advantage in devices such as those embodying the present invention whose function is purely ancillary. The oscillator comprises a single transistor TR1 with inductive coupling between its base and collector circuits. The amplifier contains three transistors, the first transistor TR2 being connected in an emitter-follower configuration to give a high input impedance, avoiding undesired damping of the tuned circuit, while the remaining two transistors TR3, TR4 are employed in grounded-emitter circuits. Transistors TR5, TR6 are found in the pulse stretching circuit, whose operation may be briefly described by saying that the amplified control signal causes a capacitor to charge via transistor TR5 and resistor RC, discharge of said capacitor then taking place via resistor RD under control of transistor TR6. Due to resistor RD having a much larger value than resistor RC, discharge of said capacitor takes a much longer time than charging, giving a pulse stretching effect.

Transistor TR7 is associated with a manual reset switch RS, and transistor TR8 forms part of a stabilising network in a power supply unit PSU.

The relay 9 of FIGURE 1 appears in FIGURE 2 as relay RL1; in this relay, contacts RL1–1 are connected to a terminal group MC, which may be connected to control circuits of an associated machine, while contacts RL1–2 serve to operate a fault-indicating lamp FL whenever an electrically conductive particle is detected.

Figure 2A:
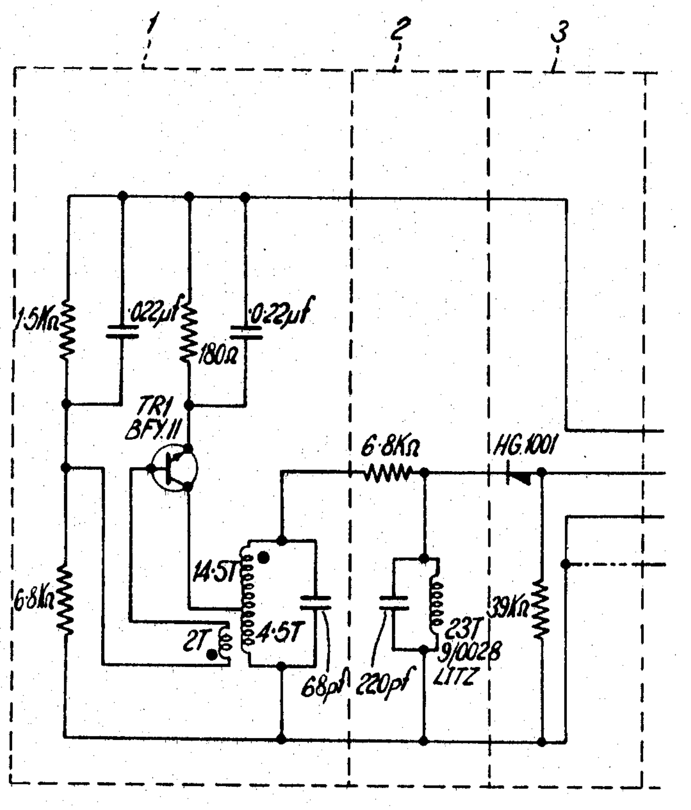
Figure 2B:
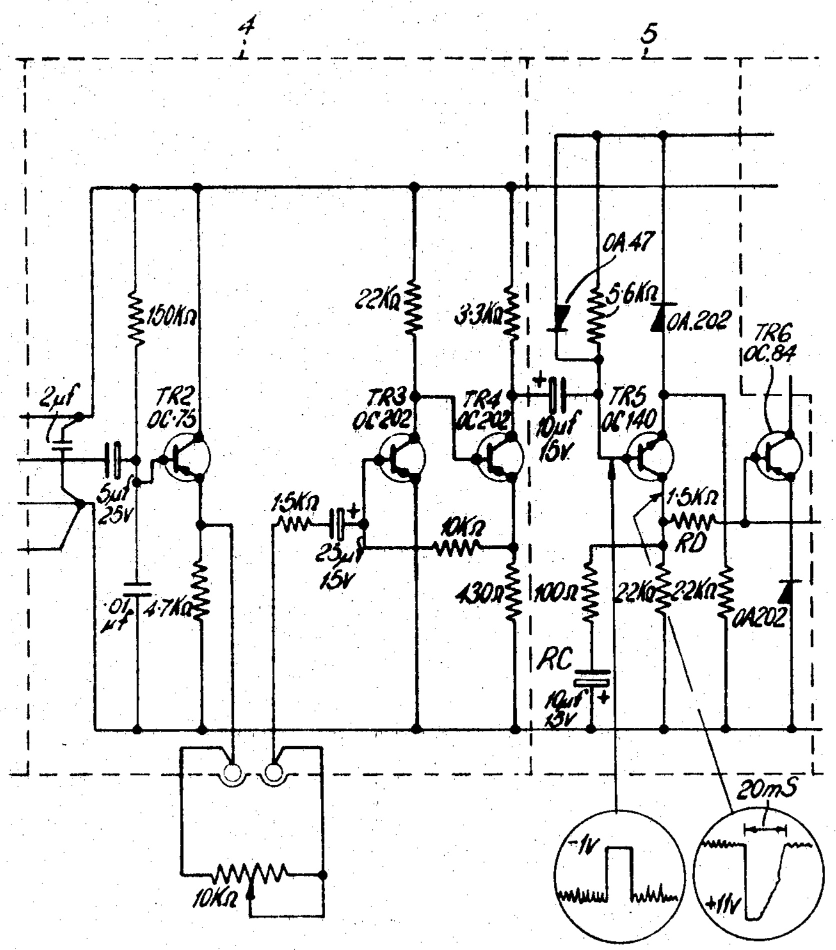
Figure 2C:
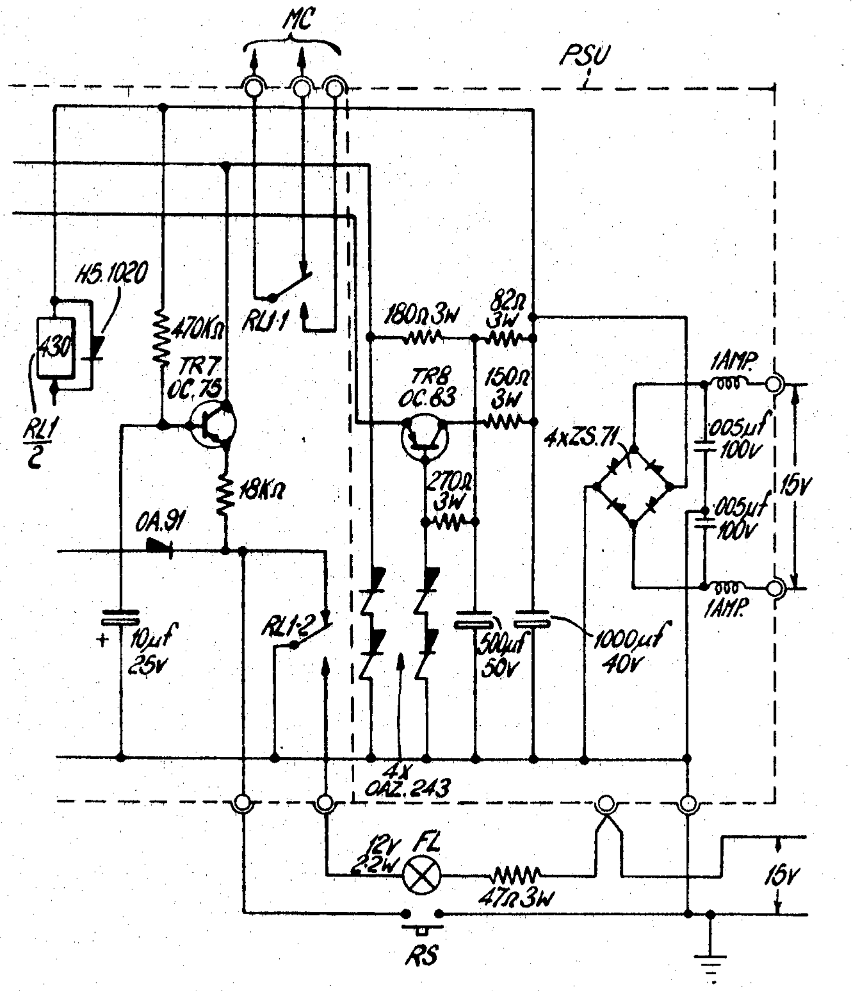

(It will be noted that FIGURE 2 is for convenience drawn in three sections, marked as FIGURES 2A, 2B and 2C; these three parts may be fitted together side-by-side, with FIGURE 2A on the left, FIGURE 2B in the centre and FIGURE 2C on the right.)

Thus it will be seen that a simple but effective detector device is provided by the invention and that such a device may be used in a variety of situations. Although one form of device embodying the invention has been described in some detail, various changes and modifications are possible without departing from the scope of the invention, for example for some purposes it may be preferable to employ the voltage across the resistor R as the output from the voltage dividing circuit and it will be appreciated that whenever there is a change in the voltage across the tuned circuit there will be an equal and opposite change in the voltage across the resistor for any given constant level of output from the oscillator.

What we claim as our invention and desire to secure by Letters Patent is:

1. A device for detecting the presence of electrically-conductive particles in non-conductive material, comprising an oscillator, a voltage divider circuit comprising a resistor in series with a parallel tuned circuit containing an inductance, said oscillator being arranged to deliver a constant output to said voltage divider circuit and said resistor being of such value that when no electrically-conductive particle to be detected is within the field of the inductance the oscillatory voltage across said tuned circuit is of the order of one-half of the total oscillatory voltage delievered to the voltage divider circuit by the oscillator, and means producing a control signal whenever the oscillatory voltage across said tuned circuit changes substantially with change in the value of said inductance due to movements of electrically-conductive particles into and out of the field of said inductance, said means comprising a detector circuit containing a diode connected across the tuned circuit, an a.c. coupled amplifier connected to receive the output of said detector circuit, and a pulse stretching circuit connected to said amplifier, said pulse stretching circuit including a capacitor for storing the amplified detector signal, transistor means responsive to the amplified detector output for controlling the charging of the capacitor, and resistive means for controlling the discharge rate of the capacitor to widen the pulse signal stored by the capacitor, said widened pulse controlling further means to actuate a relay controlled particle indicating means.

References Cited

UNITED STATES PATENTS

| | | | |
|---|---|---|---|
| 2,237,254 | 4/1941 | Broekhuysen | 324—41 |
| 2,489,920 | 11/1949 | Michel | 324—40 |
| 2,711,510 | 6/1955 | Triceboek | 324—41 |
| 2,807,720 | 9/1957 | Charles | 324—41 |
| 3,065,412 | 11/1962 | Rosenthol | 324—41 |
| 3,209,245 | 9/1965 | Hauge | 324—41 |
| 3,255,405 | 6/1966 | French | 324—34 |

RUDLPH V. ROLINEC, *Primary Examiner.*

RICHARD B. WILKINSON, WALTER L. CARLSON, *Examiners.*

R. J. CORCORAN, *Assistant Examiner.*